United States Patent
Menke

(10) Patent No.: US 7,343,333 B2
(45) Date of Patent: Mar. 11, 2008

(54) METHOD AND SYSTEM FOR CONVERTING AN ANNUITY FUND TO A LIFE INSURANCE POLICY

(75) Inventor: Robert Menke, Terra Verde, FL (US)

(73) Assignee: Bankers Insurance Group, Inc., St. Petersburg, FL (US)

( * ) Notice: Subject to any disclaimer, the term of this patent is extended or adjusted under 35 U.S.C. 154(b) by 1413 days.

(21) Appl. No.: 09/927,748

(22) Filed: Aug. 10, 2001

(65) Prior Publication Data
US 2003/0033172 A1 Feb. 13, 2003

(51) Int. Cl.
*G06Q 40/00* (2006.01)
(52) U.S. Cl. .......................... 705/35; 705/39
(58) Field of Classification Search ............... 705/35, 705/36 T
See application file for complete search history.

(56) References Cited
U.S. PATENT DOCUMENTS 4,969,094 A * 11/1990 Halley et al. ............. 705/36 R
6,950,805 B2 * 9/2005 Kavanaugh .................. 705/35
6,963,852 B2 * 11/2005 Koresko, V .................. 705/35

* cited by examiner

*Primary Examiner*—Hani M. Kazimi
*Assistant Examiner*—Olabode Akintola
(74) *Attorney, Agent, or Firm*—Arthur W. Fisher, III

(57) ABSTRACT

A method and system for converting an annuity fund to a life insurance policy at a predetermined conversion date comprising the following steps: establishing an annuity fund including selecting an initial predetermined value and purchasing an annuity for the initial predetermined value, establishing an irrevocable life insurance conversion plan including selecting the predetermined conversion date, selecting a predetermined mortality death benefit at the predetermined conversion date and purchasing a guaranteed insurability option to guarantee the availability of the predetermined mortality death benefit at the predetermined conversion date, accruing investment income within the annuity fund on a tax deferred basis until the predetermined conversion date, converting the annuity fund to the life insurance policy with the predetermined mortality death benefit at the predetermined conversion date, accruing income within the life insurance policy until the death of the owner of the life insurance policy and disbursing the death benefit to the beneficiary at the death of the owner of the life insurance policy.

1 Claim, 3 Drawing Sheets

Initial Age: 60
Conversion Age: 75

| Policy Year | Attained Age EOY | 1.25% Fees | Fund BOY | Beginning NAR | COI | Investment Income | Fund EOY | Corridor | Death Benefit |
|---|---|---|---|---|---|---|---|---|---|
| 0 | 60 | 12,500 | 987,500 | 1,065,381 | 7,270 | 78,418 | 1,058,648 | 130% | 1,023,074 |
| 1 | 61 | 13,233 | 1,045,415 | 1,065,381 | 7,270 | 83,052 | 1,121,196 | 128% | 1,083,305 |
| 2 | 62 | 14,015 | 1,107,181 | 1,065,381 | 7,270 | 87,993 | 1,187,903 | 126% | 1,147,542 |
| 3 | 63 | 14,849 | 1,173,054 | 1,065,381 | 7,270 | 93,263 | 1,259,047 | 124% | 1,216,051 |
| 4 | 64 | 15,738 | 1,243,309 | 1,065,381 | 7,270 | 98,883 | 1,334,921 | 122% | 1,289,115 |
| 5 | 65 | 16,687 | 1,318,235 | 1,065,381 | 7,270 | 104,877 | 1,415,841 | 120% | 1,367,038 |
| 6 | 66 | 17,698 | 1,398,143 | 1,065,381 | 7,270 | 111,270 | 1,502,143 | 119% | 1,450,143 |
| 7 | 67 | 18,777 | 1,483,366 | 1,065,381 | 7,270 | 118,088 | 1,594,183 | 118% | 1,538,774 |
| 8 | 68 | 19,927 | 1,574,256 | 1,065,381 | 7,270 | 125,359 | 1,692,344 | 117% | 1,633,300 |
| 9 | 69 | 21,154 | 1,671,190 | 1,065,381 | 7,270 | 133,114 | 1,797,033 | 116% | 1,734,111 |
| 10 | 70 | 22,463 | 1,774,570 | 1,065,381 | 7,270 | 141,384 | 1,908,683 | 115% | 1,841,626 |
| 11 | 71 | 23,859 | 1,884,825 | 1,065,381 | 7,270 | 150,204 | 2,027,758 | 113% | 1,956,292 |
| 12 | 72 | 25,347 | 2,002,411 | 1,065,381 | 7,270 | 159,611 | 2,154,752 | 111% | 2,078,582 |
| 13 | 73 | 26,934 | 2,127,818 | 1,065,381 | 7,270 | 169,644 | 2,290,191 | 109% | 2,209,004 |
| 14 | 74 | 28,627 | 2,261,564 | 1,065,381 | 7,270 | 180,343 | 2,434,637 | 107% | 3,500,018 |
| 15 | 75 | 30,433 | 2,404,204 | 1,065,381 | 39,011 | 189,215 | 2,554,408 | 105% | 3,500,018 |
| 16 | 76 | 31,930 | 2,522,478 | 945,610 | 37,975 | 198,760 | 2,683,263 | 105% | 3,500,018 |
| 17 | 77 | 33,541 | 2,649,723 | 816,755 | 35,985 | 209,099 | 2,822,837 | 105% | 3,500,018 |
| 18 | 78 | 35,285 | 2,787,552 | 677,181 | 32,717 | 220,387 | 2,975,221 | 105% | 3,500,018 |
| 19 | 79 | 37,190 | 2,938,031 | 524,797 | 27,772 | 232,821 | 3,143,079 | 105% | 3,500,018 |
| 20 | 80 | 39,288 | 3,103,791 | 356,939 | 20,661 | 246,650 | 3,329,781 | 105% | 3,500,018 |
| 21 | 81 | 41,622 | 3,288,158 | 170,237 | 10,754 | 262,192 | 3,539,597 | 105% | 3,500,018 |
| 22 | 82 | 44,245 | 3,495,352 | 176,980 | 12,171 | 278,655 | 3,761,836 | 105% | 3,670,120 |
| 23 | 83 | 47,023 | 3,714,813 | 188,092 | 14,072 | 296,059 | 3,996,800 | 105% | 3,900,554 |
| 24 | 84 | 49,960 | 3,946,840 | 199,840 | 16,277 | 314,445 | 4,245,008 | 105% | 4,144,182 |
| 25 | 85 | 53,063 | 4,191,945 | 212,250 | 18,822 | 333,850 | 4,506,973 | 105% | 4,401,542 |
| 26 | 86 | 56,337 | 4,450,636 | 225,349 | 21,744 | 354,311 | 4,783,203 | 105% | 4,673,167 |
| 27 | 87 | 59,790 | 4,723,413 | 239,160 | 25,086 | 375,866 | 5,074,194 | 105% | 4,959,584 |
| 28 | 88 | 63,427 | 5,010,766 | 253,710 | 28,875 | 398,551 | 5,380,443 | 105% | 5,261,304 |
| 29 | 89 | 67,256 | 5,313,187 | 269,022 | 33,119 | 422,405 | 5,702,473 | 105% | 5,578,847 |
| 30 | 90 | 71,281 | 5,631,192 | 285,124 | 37,836 | 447,469 | 6,040,825 | 105% | 5,912,752 |
| 31 | 91 | 75,510 | 5,965,315 | 241,633 | 34,452 | 474,469 | 6,405,332 | 104% | 6,203,927 |
| 32 | 92 | 80,067 | 6,325,265 | 192,160 | 29,354 | 503,673 | 6,799,584 | 103% | 6,515,023 |
| 33 | 93 | 84,995 | 6,714,589 | 135,992 | 22,198 | 535,391 | 7,227,782 | 102% | 6,848,881 |
| 34 | 94 | 90,347 | 7,137,435 | 72,278 | 12,576 | 569,989 | 7,694,847 | 101% | 7,208,809 |
| 35 | 95 | 96,186 | 7,598,662 | | | 607,893 | 8,206,555 | 100% | 7,598,662 |
| 36 | 96 | 102,582 | 8,103,973 | | | 648,318 | 8,752,290 | 100% | 8,103,973 |
| 37 | 97 | 109,404 | 8,642,887 | | | 691,431 | 9,334,318 | 100% | 8,642,887 |
| 38 | 98 | 116,679 | 9,217,639 | | | 737,411 | 9,955,050 | 100% | 9,217,639 |
| 39 | 99 | 124,438 | 9,830,612 | | | 786,449 | 10,617,061 | 100% | 9,830,612 |
| 40 | 100 | 132,713 | 10,484,347 | | | 838,748 | 11,323,095 | 100% | 10,484,347 |

Fig. 2

METHOD AND SYSTEM FOR CONVERTING AN ANNUITY FUND TO A LIFE INSURANCE POLICY

BACKGROUND OF THE INVENTION

1. Field of the Invention

A method and system for converting an annuity fund to a life insurance policy at a predetermined conversion date.

2. Description of the Prior Art

Annuities and life insurance are designed to meet different specific financial planning objectives. Since the Internal Revenue Code can have a significant impact on the realization of a person's particular goals, tax consideration of the tax consequences in the selection and purchase of annuities and/or life insurance is often a compromise.

Investment income from the cash values inside the annuity appreciates on a tax deferred basis. Such annuities have no death benefit other than the return of the current account value. Thus, none of the premium for the annuity is invested in current mortality costs. Except for any costs and fees, the entire annuity deposit is available to earn investment income.

Distributions of the investment income to the annuitant are taxed as ordinary income. Upon death, the proceeds of the annuity are income in respect of a decedent and taxed as ordinary income to the estate.

On the other hand, variable universal life insurance policies that qualify under Section 7702 of the U.S. Internal Revenue code have significant tax benefits. In order to qualify within the IRC, not only must the investment meet the diversification requirements identical to the diversification requirements for annuities, but the death benefit in relationship to the premium deposit must first satisfy the Guideline Single Premium (GSP) requirement as statutorily mandated. Otherwise the policy will not qualify as a life insurance policy under Section 7702. The GSP defines maximum premium payable with respect to the initial death benefit. In addition, a cash value corridor that varies by age, between the face amount and the account value must be maintained at all time.

The difference between the initial face amount, as determined by the GSP, and the initial account value is the amount of the mortality insurance established at the time of automatic conversion to the life insurance policy. Since the cash value corridor decreases by age, the required Face Amount in relationship to the account value decreases. Therefore the mortality element as required by Section 7702 decreases as the age of the applicant increases.

To the extent the assets of the life policy are used to purchase mortality insurance, such assets are not available for investment purposes. The younger the person is that is proposed to be the insured life, the greater impact this concern will have on the decision to purchase the life policy.

Significantly, an owner of a life insurance policy can exchange that policy for another life policy or for an annuity without an event of recognition under the U.S. tax laws as a Section 1035 exchange. Similarly, an owner of an annuity can exchange that annuity for another annuity without a tax consequence under Section 1035.

Unfortunately, the owner of an annuity cannot exchange for a life insurance policy without an event of tax recognition under Section 1035. Instead, the annuity holder would be taxed at ordinary rates on the difference between his tax basis in the annuity and the proceeds of the annuity.

Thus, there is need for a method or system that is an annuity at the time of creation, but will convert automatically, and without further election on the part of the owner, into a variable universal life insurance policy at a specified date in the future.

At the time of the conversion from an annuity to a life policy, the amount of mortality insurance will be significantly less than if the product had been a life insurance policy from the outset. Further, there is a build up of investment income with which to pay for the mortality charges.

The reason for the automatic conversion is to avoid the unfavorable tax treatment associated with an exchange of an annuity for a life policy.

Various examples of financial planning methods are found in the prior art as exemplified by the following patent.

U.S. Pat. No. 6,064,969 describes an investment system including a computer implemented annuity system generating annuity proposals for customers comprising a memory storing customer information input from a customer and annuity information and a processor to retrieve the customer and annuity information from the memory and generate an annuity proposal responsive to the customer and annuity information. According to the annuity system, the annuity proposal includes one of the fixed period installments, life, joint and survivor, joint and contingent and proceeds at interest annuities. The proceeds at interest annuity may also be viewed as a flexible certificate of deposit investment proposal for use by companies providing banking services.

U.S. Pat. No. 4,750,121 teaches a pension benefits system for enrolled employees comprising a trust institution and a life insurer institution where the trust institution receives periodic payments, purchases and retains a life insurance policy from the life insurance institution covering each enrolled employee, invests in available securities, provides specific accurate future projections of periodic benefits, receives all life insurance policy proceeds upon the death of each enrolled employee and distributes all periodic payable benefits.

U.S. Pat. No. 4,969,094 relates to a self-implementing pension benefits system for subscriber employees including a life insurer institution and a lending institution. The life insurer trust institution computes and receives each subscriber employee's periodic payment primarily upon each subscriber employee's age and desired periodic benefits and issues a life insurance policy covering each subscriber employee providing specific accurate future projections of periodic benefits for retirement, death or disability; and distributing all life insurance policy proceeds upon the death of each enrolled employee to the lending institution.

U.S. Pat. No. 6,161,096 describes a method for a deferred award instrument plan by identifying at lease one participant in the deferred award plan, retrieving financial data related to stock options corresponding to the identified participant, computing a spread associated with the retrieved stock options, establishing a trust with the spread, determining whether a life insurance policy has been purchased by the participant, determining whether a split dollar agreement has been executed, monitoring and paying at least one premium for the life insurance policy and notifying the participant that a payment associated with the life insurance policy has been paid.

A study of the prior art illustrates the need for a flexible financial estate program or plan capable of maximizing return on capital that minimizes the tax consequences and associated increased charges.

SUMMARY OF THE INVENTION

The present invention relates to a method and system to establish and administer a plan convertible from an annuity phase and a life insurance phase. Specifically, the plan is designed to optimize the financial benefits of an annuity plan and a life insurance policy with the least or reduced tax consequences to the plan owner and beneficiaries.

The method and system provides a mechanism for managing the plan in the annuity phase and the insurance phase and to automatically convert the annuity plan to a life insurance policy qualified under Section 7702 of the U.S. Internal Revenue Code to satisfy the Guideline Single Premium requirement.

In particular, the method and system comprises establishing an annuity fund of a predetermined value, establishing an irrevocable life insurance conversion plan, accruing investment income within the annuity fund on a tax deferred basis until the predetermined conversion date, converting the annuity fund to a qualified life insurance policy with a predetermined mortality death benefit at the predetermined conversion date and finally disbursing the death benefit to beneficiary at the death of the owner of the qualified life insurance policy.

The irrevocable life insurance conversion plan includes selecting the predetermined conversion date, selecting a predetermined initial mortality death benefit at the predetermined conversion date and purchasing a guaranteed insurability option to guarantee the availability of the predetermined mortality death benefit at the predetermined conversion date.

Once the annuity fund is converted to the life insurance policy with the predetermined mortality death benefit, income is accrued within the life insurance policy until the death of the owner of the life insurance policy at which time the death benefit is disbursed to the beneficiary. The cost of insurance and guaranteed insurability is determined by the age, sex and health condition including smoking status of the plan owner.

A processor comprising an input means, a storage means, a display means and a processing means including a calculating means is employed to model or create and to administer the convertible plan.

To implement the method and system of the present invention, the owner of the plan selects a plurality of plan parameters including the initial value or amount of the annuity fund, the value or amount of the mortality death benefit and the date for converting from the annuity phase to the insurance phase. The cost of the guaranteed insurability option is also ascertained.

The selectable plan parameters together with cost of the guaranteed insurability option and annual or periodic plan management fee are entered into a data base within the storage means. Of course, the cost of the guaranteed insurability option and periodic plan management fee as well as a table for the corridor required to meet the Guideline Single Premium requirement may be entered and maintained in storage independent of entry and storage of the plurality of plan parameters.

Once the data and values are stored in or entered into the processor, the various values and amounts for the plan during the annuity phase and the life insurance phase can be calculated and displayed either on a CRT or similar device or in printed form. With plan parameters, incremental investment income, cost of the guaranteed insurability option and periodic management fee, the calculating means is capable of calculating or generating the beginning of year fund value, net amount at risk, cost of insurance, either the cost of the guaranteed insurability option during annuity phase or the mortality death benefit cost during life insurance phase, investment income, end of year fund value, corridor data or percentage and total death benefit. Thus, actual value and forecast value of the plan in either phase can be calculated and displayed.

The invention accordingly comprises the features of construction, combination of elements, and arrangement of parts that will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which:

FIG. 2 depicts a model or example of the method and system of the instant invention.

Similar reference characters refer to similar parts throughout the several views of the drawings.

DETAILED DESCRIPTION OF THE PREFERRED EMBODIMENT

The present invention relates to a method and system for converting an annuity fund to a life insurance policy at a predetermined conversion date. The method and system provides a means to establish and administer a plan convertible from an annuity to a life insurance upon the selection of a plurality of plan parameters by a prospective plan owner. The plurality of plan parameters includes the initial annuity fund deposit, plan issue age or date, conversion age or predetermined conversion date initial death benefit amount and periodic or annual plan management fee. With this data or information and a projected return or periodic incremental investment income the convertible plan can be modeled for the duration of the plan including the annual beginning of year fund value, annual beginning of year net at risk amount, cost of insurance with the cost of the guaranteed insurability option during the annuity phase or the mortality death benefit during the life insurance phase, annual end of year fund value and annual year end death benefit.

In particular, the method and system provides a mechanism for managing the plan in the annuity phase and the insurance phase and to automatically convert the annuity plan to a life insurance policy qualified under Section 7702 of the U.S. Internal Revenue Code to satisfy the Guideline Single Premium requirement.

In particular, the method and system comprises establishing an annuity fund of a predetermined value, establishing an irrevocable life insurance conversion plan, accruing investment income within the annuity fund on a tax deferred basis until the predetermined conversion date, converting the annuity fund to a qualified life insurance policy with a predetermined mortality death benefit at the predetermined conversion date and finally disbursing the death benefit to beneficiary at the death of the owner of the qualified life insurance policy.

The irrevocable life insurance conversion plan includes selecting the predetermined conversion date, selecting a predetermined initial mortality death benefit at the predetermined conversion date and purchasing a guaranteed insurability option to guarantee the availability of the predetermined mortality death benefit at the predetermined conversion date.

Once the annuity fund is converted to the life insurance policy with the predetermined mortality death benefit, income is accrued within the life insurance policy until the death of the owner of the life insurance policy at which time the death benefit is disbursed to the beneficiary.

Figure 3:
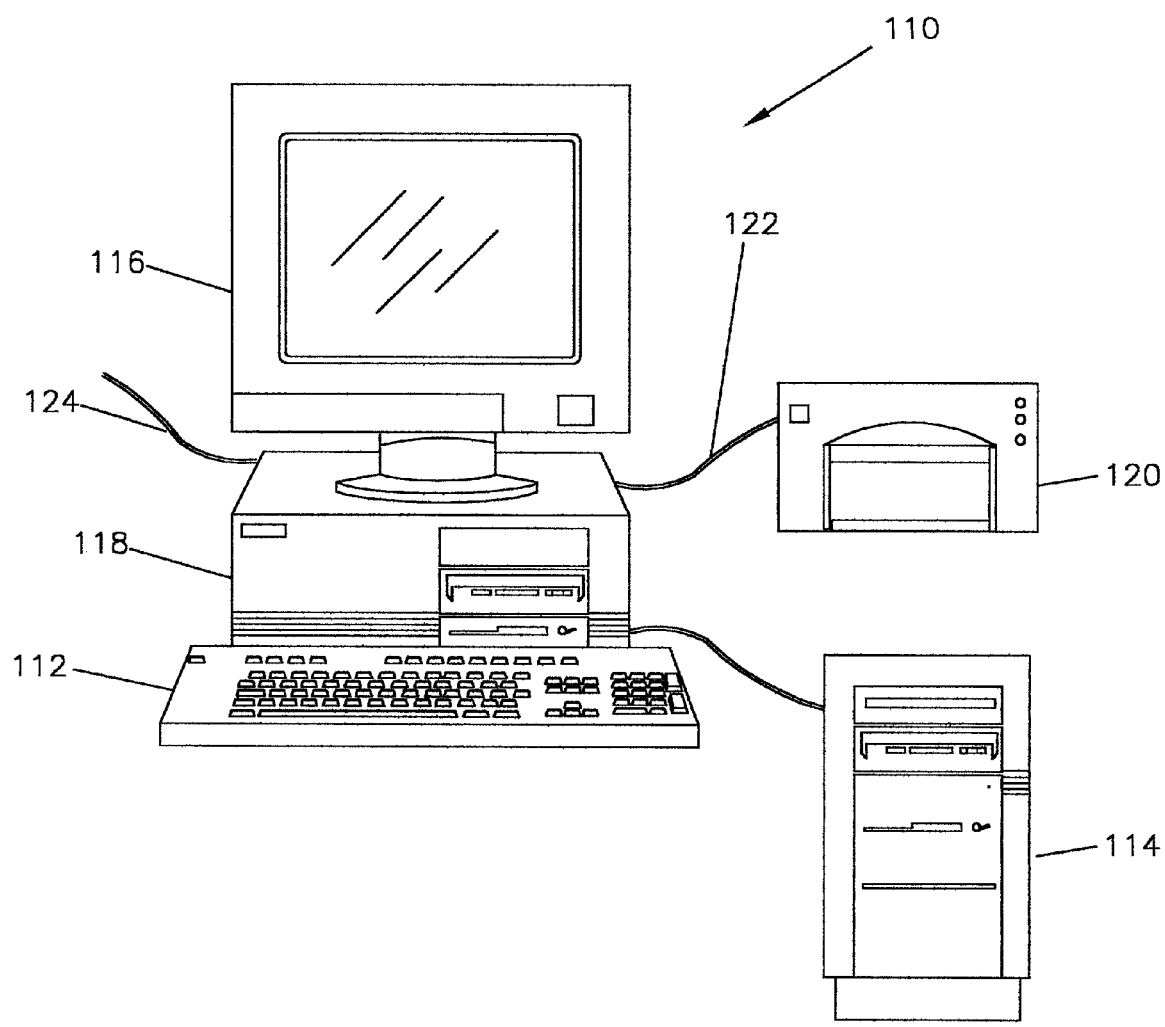
FIG. 3 shows a processor to implement the method and system of the instant invention.

As shown in FIG. 3, a processor generally indicated as 110 comprising an input means or keyboard 112, a hard drive storage means 114, a display means 116 and a processing means 118 including a calculating means and storage is employed to model or create and to administer the convertible plan. The processor 110 is coupled to a printer 120 by a cable 122. Further, the processor 110 may also be operably coupled to an external or remote terminal by communications link 124.

To implement the method and system of the present invention, the owner of the plan selects a plurality of plan parameters including the initial value or amount of the annuity fund, the value or amount of the initial mortality death benefit and the date for converting from the annuity phase to the insurance phase. The cost of the guaranteed insurability option is also ascertained.

The selectable plan parameters together with cost of the guaranteed insurability option and annual or periodic plan management fee are entered into a data base within the storage means. Of course, the cost of the guaranteed insurability option and periodic plan management fee as well as a table for the corridor required to meet the Guideline Single Premium requirement may be entered and maintained in store independent of entry and storage of the plurality of plan parameters.

Once the data and values are stored in processor 110, the various values and amounts for the plan during the annuity phase and the life insurance phase can be calculated and displayed either on a CRT or similar device or in printed form, stored or transmitted. With plan parameters, incremental investment income, cost of the guaranteed insurability option and periodic management fee, the calculating means is capable of calculating or generating the beginning of year fund value (BOYFV), net amount at risk (NAR), cost of insurance (COI), either the cost of the guaranteed insurability option during annuity phase or the mortality death benefit cost during life insurance phase, investment income (II), end of year fund value (EOYFV), corridor data or percentage (CP) and total death benefit (TDB). Thus, actual value and forecast value of the plan in either phase can be calculated, stored and displayed.

Figure 1:
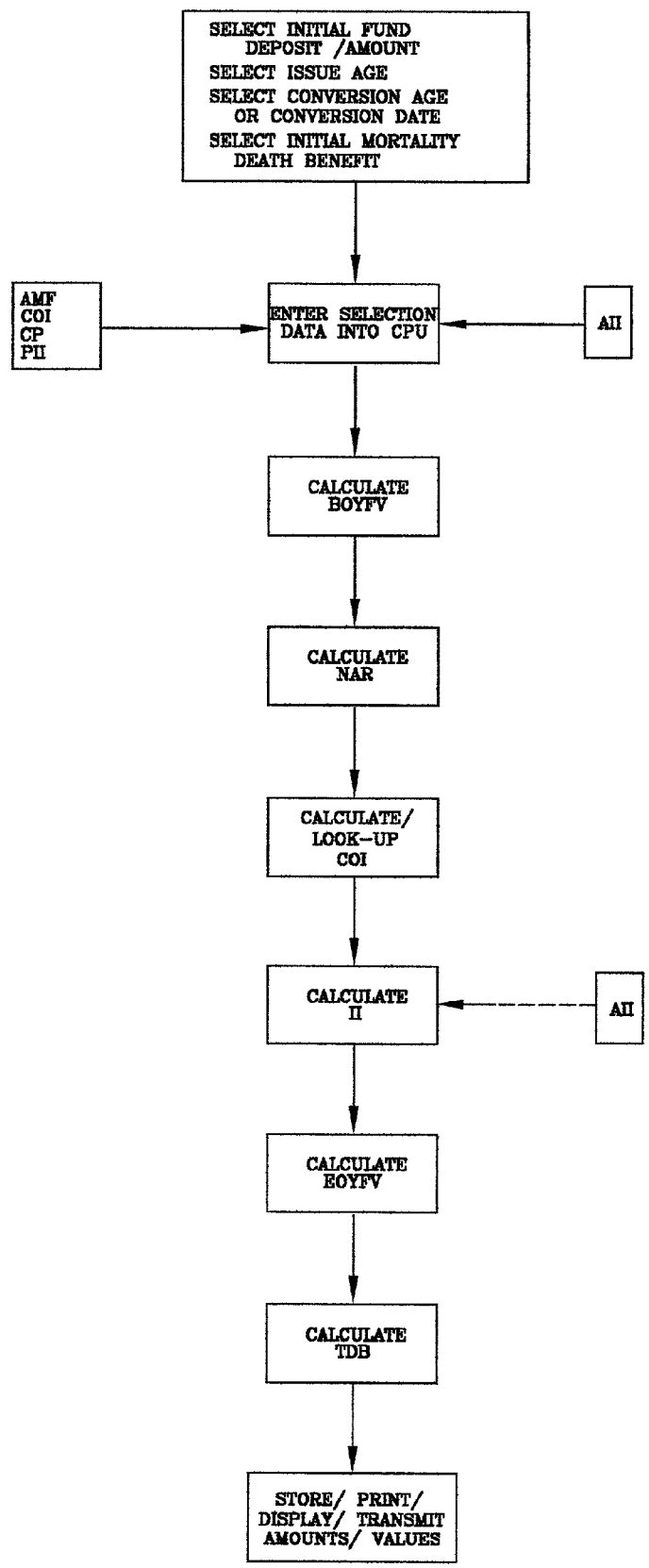
FIG. 1 is a flow chart depicting the method and system of the instant invention.

The convertible plan model is best understood with reference to FIGS. 1 and 2. Specifically, the prospective convertible plan owner selects or chooses the initial fund deposit or amount such as $1,000,000; issue age such as 60, conversion age such as 75 or date of conversion such as 15 years from establishing the fund and the initial mortality death benefit at date of conversion from the annuity phase to the insurance phase such as $3,500,018. This data is entered into the processing means 118 through the keyboard 112 as shown in FIG. 3. Once entered, the computer system generates the various periodic or annual variables of BOYFV, NAR, EOYFV and TDB by applying constants of the agreed upon annual management fee (AMF) as a percentage of the annual beginning fund amount, the COI as determined by the issue age, conversion age and initial mortality death benefit and corridor percentage or required by Section 7702 along with the projected investment income (PII) or actual investment income (AII). The actual investment income will be entered through the keyboard 112. Except for the actual investment income, those values may reside in memory for look-up once the variables are selected.

As shown, the initial beginning of year fund value (BOYFV) of $987,500 is the initial deposit $1,000,000 less the annual management fee (AMF) which is for example of $12,500 or 1.25 percent of the initial deposit. Thereafter, the annual beginning of year fund value is the previous annual end of year fund value less the annual management fee. For example, at the beginning of the tenth year, the BOYFV for year 10 is $1,774,570. That is, the EOYFV for year 9 of $1,797,033 less $22,463 or 1.25 percent (AMF) of the EOYFV for year 9.

The net amount at risk (NAR) during the annuity phase is calculated as the difference between the total death benefit (TDB) at the date of conversion or $3,500,018 and the end of year fund value (EOYFV) of $2,434,637 at date of conversion (year 14) or $1,065,381. The net amount at risk (NAR) during the insurance phase is calculated as the difference between the year end total death benefit (TDB) and the previous year end fund value (EOYFV). For example, the net amount at risk (NAR) for policy year 20 is $356,393 or $3,500,018 total death benefit (TDB for policy year 20) less $3,143,079 (EOYFV for year 19).

During the annuity phase, the cost of insurance is determined by the amount of selected initial death benefit, issue age of person and conversion age of person. For the example or model shown in FIG. 2, the COI is $7,270 annually, which is deducted from the fund. The COI during the insurance phase which varies annually is determined by the re-insurer's or insurer's rate maintained in look-up tables or database in the processor 110 derived from predetermined actuarial statistics.

Projected investment income (PII) is calculated as an expected rate of return (ROT) that may be a constant or a variable by changing the ROT through the keyboard 112. The actual investment income (AII) is input into the processor 110 as actual and historical data is available. In either the annuity phase or insurance phase, the EOYFV is calculated as the BOYFV less the COI increased by PII or AII. For example, in policy year 10, the BOYFV of $1,774,470 is reduced by the COI of $7,270 and increased by the PII or AII of $141,384 for an EOYFV of $1,908,683. As previously described, the EOYFV is used to calculate the next succeeding BOYFV.

The TDB during the annuity phase is equal to the actual value of the fund at the time of death. For example, in policy year 10, the TDB would be between $1,774,570 (BOYFV) and $1,908,683 (EOYFV).

During the insurance phase, the TDB is equal to the CP of the BOYFV or the selected initial death benefit which ever is greater. For example, in policy year 20, the product of the 105 percent (CP) and the BOYFV of $3,103,791 is $3,258,980 or less than the selected initial mortality death benefit of $3,500,018. Therefore, the TDB is $3,500,018 for policy year 20. On the other hand, in policy year 22, 105 percent (CP) of the BOYFV of $3,495,352 is $3,670,120 or greater than the selected initial mortality death benefit of $3,500,018. Therefore, the TDB is $3,670,120 for policy year 22.

As described and illustrated, the values or amounts of the various parameters can be calculated for any particular period and over the span of the fund plan by the processor 110. So calculated, the values can be displayed on the display means 116, printed on the printer 120 and/or transmitted over a communications link 124 to an external or remote terminal.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A method for converting an annuity fund to a life insurance policy at a predetermined conversion date comprising the steps of:

establishing an annuity fund of a predetermined value;

establishing an irrevocable life insurance conversion plan, accruing investment income within the annuity fund on a tax deferred basis until the predetermined conversion date;

converting the annuity fund to a qualified life insurance policy with a predetermined mortality death benefit at the predetermined conversion date; and disbursing the death benefit to beneficiary at the death of the owner of the qualified life insurance policy, said irrevocable life insurance conversion plan includes selecting the predetermined conversion date, selecting a predetermined initial mortality death benefit at the predetermined conversion date and purchasing a guaranteed insurability option to guarantee the availability of the predetermined mortality death benefit at the predetermined conversion date whereby once the annuity fund is converted to the life insurance policy with the predetermined mortality death benefit, income is accrued within the life insurance policy until the death of the owner of the life insurance policy at which time the death benefit is disbursed to the beneficiary.

* * * * *